United States Patent [19]

Holmes et al.

[11] Patent Number: 4,619,423
[45] Date of Patent: Oct. 28, 1986

[54] GEOMETRIES FOR ROUGHNESS SHAPES IN LAMINAR FLOW

[75] Inventors: Bruce J. Holmes; Glenn L. Martin, both of Newport News; Christopher S. Domack, Hampton; Clifford J. Obara, Poquoson, all of Va.; Ahmed A. Hassan, Tempe, Ariz.

[73] Assignee: The United States of America as represented by the Administrator of the National Aeronautics and Space Administration, Washington, D.C.

[21] Appl. No.: 550,681

[22] Filed: Nov. 10, 1983

[51] Int. Cl.⁴ .................................................. B64C 21/10
[52] U.S. Cl. .................................. 244/130; 244/35 R; 244/200; 244/204
[58] Field of Search .................. 244/35 R, 199, 200, 244/123, 130, 134 B, 204

[56] References Cited

U.S. PATENT DOCUMENTS

| | | | |
|---|---|---|---|
| 1,746,140 | 2/1930 | Bobo | 244/200 |
| 2,261,558 | 11/1941 | Orloff | 244/130 |
| 2,321,837 | 6/1943 | Maxwell | 244/123 |
| 2,386,170 | 10/1945 | Watter | 244/123 |
| 2,470,128 | 5/1949 | Barrick et al. | 244/134 B |
| 2,473,728 | 6/1949 | Rutledge | 244/123 |
| 2,613,893 | 10/1952 | Young | 244/123 |
| 2,739,770 | 3/1956 | Fanti et al. | 244/200 |
| 2,899,150 | 8/1959 | Ellis, Jr. | 244/130 |
| 4,258,889 | 3/1981 | Hunt | 244/130 |
| 4,354,648 | 10/1982 | Schenk et al. | 244/130 |

FOREIGN PATENT DOCUMENTS 402236  11/1933  United Kingdom ................ 244/130

Primary Examiner—Galen L. Barefoot
Assistant Examiner—Rodney Corl
Attorney, Agent, or Firm—Howard J. Osborn; John R. Manning

[57] ABSTRACT

This invention is for a passive laminar flow airfoil which has an upper skin 12 and lower skin 14 joined at a trailing edge 16. A leading edge structure 20, such as de-icing equipment, is joined to the upper and lower skins by interface mechanisms 30 and 35. Generally, the interface mechanisms are forward facing steps, with or without adjacent gaps, shaped and dimensioned to accomplish laminar flow using standard airfoil manufacturing techniques.

22 Claims, 12 Drawing Figures

GEOMETRIES FOR ROUGHNESS SHAPES IN LAMINAR FLOW

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

This invention relates to the field of laminar flow over an airfoil. More particularly the invention is directed to providing a passive device which may be utilized as an interface mechanism between leading edge devices such as flaps, slats, and ice protection equipment normally forming the leading edge structure of an airfoil, and the remaining upper and lower skin surface of the airfoil. Practical uses for the invention also exist for underwater laminar flow surfaces and on automobile laminar surfaces.

BACKGROUND ART

The successful use of laminar flow to reduce drag on airplanes has been inhibited in the past by the inability of early airframe manufacturing techniques to meet the roughness and waviness requirements for stable laminar flow to occur. Modern airframe construction such as bonded or milled aluminum skins or composite skins are sufficiently free from significant roughness and waviness for successful use of natural laminar flow for drag reduction. The currently accepted natural laminar flow wing design practices, however, exclude the installation of wing-leading edge devices in order to preserve the smoothness of the leading edge so that the laminar flow can be maintained.

Even in the absence of leading edge devices such as slats, flaps, or de-icers, the production of the airfoil wherein leading edge structure interfaces with the upper and lower skin surfaces of the airfoil often results in an orthogonal step (forward or aft facing) or a gap. These steps or gaps on current airplanes manufactured to modern production tolerances are sufficiently large to cause the laminary boundary layer to transition to a turbulent boundary layer at or near the step or gap, thus greatly increasing wing drag.

Various techniques have been tried to overcome the above mentioned difficulties; however, only one previous known method has been utilized to successfully overcome the problem. This method is the use of suction upstream and/or downstream of a step or gap. Using this method, even if the step or gap which causes the transition is of considerable magnitude, it is possible to apply sufficient suction to relaminarize a turbulent boundary layer downstream of the step or gap. There are many problems associated with the suction technique for maintaining laminar flow which include its power requirements, cost, maintainability, and complexity. The active boundary layer suction technique utilizes suction of air through small slots or tiny holes in porous surfaces. These slots must be very accurately machined or the holes carefully drilled (by electron or laser beam techniques, for example). The suction system must be powered by a suction pump and connected to internal ducting for suction of the air mass flow. All of these system design, manufacturing, and component requirements combine to make the suction method expensive, relatively inefficient, and complex. The suction technique also results in an aerodynamic disadvantage as the laminar boundary layer is thinned by the suction. This thinner laminar boundary layer is then more sensitive to transition due to roughness; for example, caused by ice or insect debris which often occur on the leading edge region of the airfoil. Further, the suction slots or holes must be kept free from dust, dirt and debris which entails considerable maintenance cost.

SUMMARY OF THE INVENTION

This invention provides a passive interface mechanism between the main skin panels of the airfoil and the leading edge structure, which overcomes the difficulties inherent in the prior art arrangement described above. By proper shaping of the forward facing step or gap, it is possible to favorably modify the geometry of the resulting laminar separation regions. Furthermore, by properly shaping the interface structure, it is possible to allow a larger step height without causing laminar boundary layer transition. With proper selection of step shape and height, the resulting disturbances in the laminar boundary layer can be made so small that premature boundary layer transition, relative to where the transition would have occurred in the absence of a step, can be eliminated. By properly rounding the step, or otherwise shaping the step, and in some instances utilizing a gap in conjunction with a particular step shape, the critical step height increases by more than 50 percent relative to the orthogonal sharp edged step. For specially shaped gaps, the critical gap width may be increased. This special shaping of the interface mechanism at the juncture of the leading edge structure with both the upper and lower main wing skin panels allows laminar flow to occur over both the upper and lower surfaces of the airfoil.

In accordance with this invention, it is, therefore, an object of the invention to provide a passive structural design between the main skin frame of an airfoil and the leading edge thereof to maintain laminar flow over the airfoil.

It is a further object of the invention to provide a passive interface mechanism which is a forward facing step that is properly shaped to enable laminar flow over the airfoil.

It is yet another object of the invention to provide a passive interface mechanism between the leading edge structure and the main skin structure which is both gapped and shaped in a manner to enable laminar flow over the airfoil.

Still another object of the invention is to provide a two-dimensional passive interface mechanism which will increase the allowable height or gap width of the interface to facilitate installation of leading edge devices using practical manufacturing methods.

A further object of the invention is to provide a passive interface mechanism between the leading edge structure and the main skin panels which is shaped so that the airfoil is not as sensitive (compared to active suction methods) to ice, dust, dirt, insect and other debris which might cause laminar boundary layer transition.

These and other objects and advantages of the invention will become more apparent when considered in conjunction with the accompanying drawings.

DESCRIPTION OF BEST MODE FOR CARRYING OUT THE INVENTION

Figure 1:
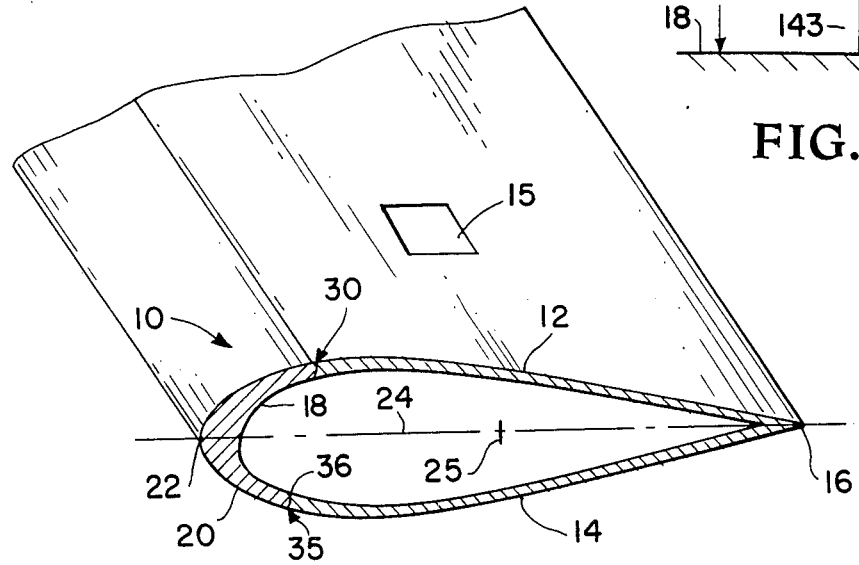
FIG. 1 is a cross-sectional view of the invention installation on an airfoil also showing a portion of the airfoil in perspective to indicate its spanwise features.

The overall invention is best illustrated in FIG. 1 which shows an airfoil incorporating the principles of the invention, and designated generally by the reference numeral 10. The airfoil 10 has an upper skin structure 12 which may consist of a series of skin panels joined together in the spanwise and chordwise direction in a manner known in the laminar airfoil manufacturing art. The airfoil 10 has similar lower skin panels 14 which are joined to the upper skin panels 12 at the trailing edge 16 in a conventional manner. The leading edge of the airfoil 18 is a separate structure which must be joined to the upper and lower skins 12 and 14, respectively. It should be understood that in certain applications of the invention the leading edge wing structure 18 may be smoothly joined to the upper skin 12 and lower skin 14 without the use of other leading edge structural devices. FIG. 1, however, shows a leading edge device 20 in conjunction with the airfoil which for purposes of illustration is considered to be a de-icing boot which might be utilized with the invention airfoil.

The upper and lower wing skins 12 and 14 may be made of materials such as bonded or milled aluminum, or composites any or all of which may be constructed in a manner sufficiently free from roughness and waviness for attainment of natural laminar flow over the surface. The leading edge structure 18 may be made of similar material, particularly if it is utilized without other leading edge devices. It should be further understood that the leading edge structure 20 associated with the airfoil may be other structure such as high lift leading edge flaps or slats, all of which are encompassed by the concept of the invention. The leading and trailing edges of inspection covers 15 (which provide internal wing access) may also benefit from the concept of the invention.

A chordline 24 is shown in FIG. 1 which runs between the nose 22 and the trailing edge 16 of the airfoil. The chordline establishes a reference for the description of the interface mechanism designated generally by the reference numeral 30 shown in greater detail in FIG. 2. The mid-chord point 25 also serves as a reference in describing the invention.

Figure 2:
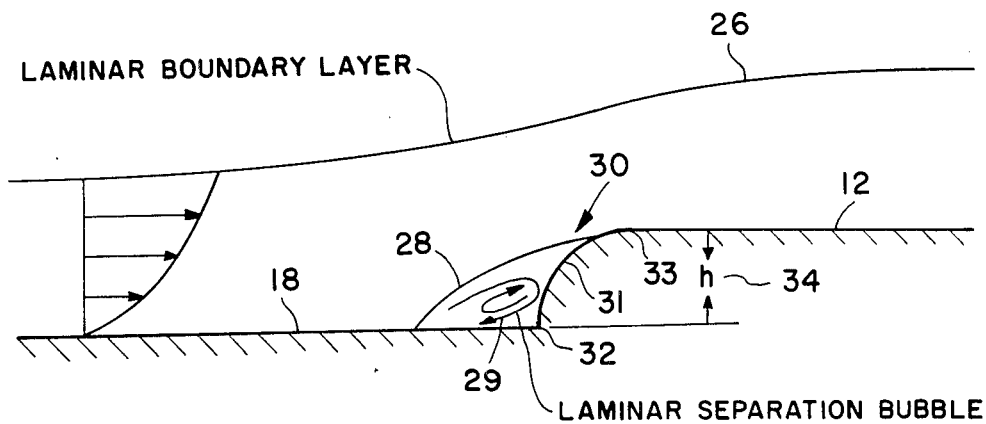
FIG. 2 is a cross-sectional view of the interface mechanism shown in FIG. 1 substantially enlarged for purposes of clarity.

FIG. 2 shows the interface mechanism 30 which is of the particular shape and dimension to delay the occurrence of laminar boundary layer transition. It has been found that by providing the proper radius for the surface 31 which connects with the leading edge structure 18 and 32 and the airfoil main skin panels 12 at the point 33, that laminar flow can be maintained with larger step heights. In the FIG. 2 arrangement, the radius of the surface 31 is equal to the height 34. In successful test runs the radius of the surface 31 ranged from twenty to thirty thousandths of an inch. Based on experimental results, the following criterion may be used to calculate allowable step sizes (h, ft) at the cruise unit Reynolds number (R', ft$^{-1}$) for an airplane, where h is less than $2700/R'$. R' is equal to the freestream velocity divided by the kinematic viscosity of air (or water) at the test conditions. For three different sizes of airplanes, the following step heights which result from use of this criterion are set forth in the Table below.

TABLE I

| Airplane Type | Cruise Conditions | | R' × 10$^6$ ft$^{-1}$ | h, in. |
| --- | --- | --- | --- | --- |
| | Mach | Alt., ft | | |
| Boeing 767 Transport | 0.8 | 41,000 | 1.5 | 0.022 |
| Lear 55 Business Jet | 0.7 | 51,000 | 0.8 | 0.041 |
| Saab Fairchild SF-34 Commuter Airliner | 0.4 | 15,000 | 2.0 | 0.016 |

These allowable step sizes are at least 50% larger than sharp-edged orthogonal steps utilized in prior art junctures between leading edge structure and main skin panels, meaning that the invention passive interface mechanisms are significantly easier to manufacture and maintain on laminar flow wings with leading edge devices.

FIG. 2 also shows the boundary layer flow over the airfoil. The outer edge of the laminar boundary layer is designated by the reference numeral 26, and the surface of the free shearlayer by the reference numeral 28. The flow diagram shows that the free shear surface 28 of the boundary layer moves from the leading edge structure 18 to and over the skin structure 12. The usual laminar separation bubble 29 forms at the front of the interface mechanism 30.

The interface mechanism 35 is similar in design to the interface mechanism 30, other than it appears on the lower surface of the airfoil as shown in FIG. 1. The interface mechanism 35 has a rounded surface 36 (like 30) with a radius equal to the height of the step from the leading edge surface down to the main skin panels of the lower surface of the airfoil. Since the interface mechanism 35 is essentially similar to the interface mechanism 30, it is not believed necessary to explain the structure in greater detail.

Figure 3:
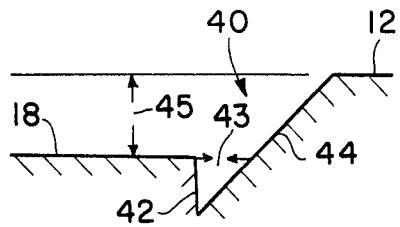
FIG. 3 is a cross-sectional view of an alternate shape of the interface mechanism.

There are many designs of interface mechanisms which may accomplish the objects of the invention. One such design is shown in the alternate embodiment of the invention shown in FIG. 3 and designated generally by the reference numeral 40. The interface mechanism 40 is associated with the leading edge structure 18 and the main wing panel structures 12 or 14, depending on whether it is connecting the upper or lower skin surfaces. The interface mechanism 40 has a first surface 42 which is directed inwardly toward the chordline 24 of the airfoil, at an angle which is perpendicular to the leading edge structure 18. The second surface 44 of the interface mechanism is connected to the end of the surface 42 and directed at an acute angle of approximately 45° up from surface 42 and away from the chordline 24 connecting with the main skin panel 12. This arrangement results in a gap 43 being formed between the first surface 42 and the second surface 44. The gap 43 tends to trap the laminar separation bubble which forms in front of the step thereby minimizing its tendency to cause transition of the laminar boundary layer. The height of the step for the interface mechanism 40 is the perpendicular distance between the leading edge structure 18 and the skin 12, and is designated by the reference numeral 45.

Figure 4:
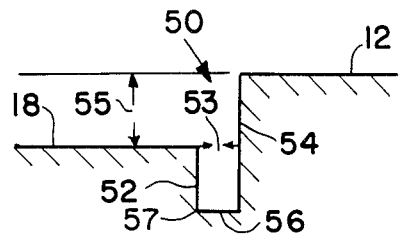
FIG. 4 is another alternate shape of the interface mechanism.

Another embodiment of the interface mechanism is shown in FIG. 4 and designated generally by the reference numeral 50. The interface mechanism 50 has the first surface 52 which is directed generally inward toward the chordline 24 and at an angle perpendicular to the leading edge structure 18. A second surface 54 of the interface mechanism is positioned parallel to the first structure and connects with the skin structure 12. The third surface 56 joins the first and second surfaces 52 and 54 forming the bottom of a gap 53. The height of the step in this embodiment of the invention is the perpendicular distance between the leading edge structure 18 and the skin structure 12 and is designated by the reference numeral 55.

Figure 5:
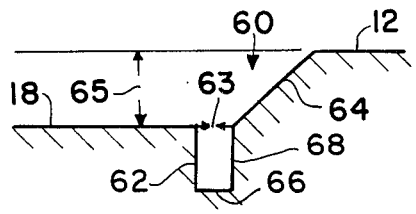
FIG. 5 is still another alternate view of the interface mechanism.

FIG. 5 shows another shape of the interface mechanism designated generally by the reference numeral 60. This interface mechanism has a first surface 62 which is directed inwardly toward the chordline 24 and in a direction normal to the leading edge structure 18. A fourth surface 68 is positioned parallel to the first surface 62 and is of the same length. The first and fourth surfaces are joined together by the third surface 66 forming the bottom of a gap 63. The second surface 64 is connected to the fourth surface 68 and is directed at an angle of approximately 45° thereto and connects with the skin structure 12. As in the other embodiments the height 65 is the perpendicular distance between the leading edge structure 18 and the skin structure 12.

Figure 6:
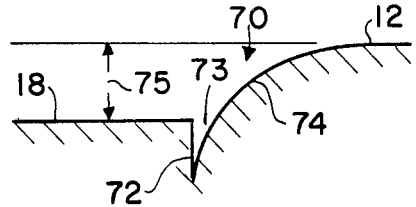
FIG. 6 is another alternate view of the interface mechanism.

FIG. 6 shows another interface mechanism designated generally by the reference numeral 70. In this arrangement, the first surface 72 of the interface mechanism is connected to the leading edge structure 18 and is directed inwardly toward the chordline 24 at an angle normal to the leading edge structure 18. The second surface of the interface mechanism is a curved surface 74 which connects to the end of the first surface 72 and to the skin surface 12. The radius of the second surface 74 is equal to the perpendicular distance between the bottom of the first surface 72 and the skin surface 12. A gap 73 is formed between the first surface 72 and the second surface 74. The height 75 is the perpendicular distance between the leading edge structure 18 and the skin surface 12.

Figure 7:
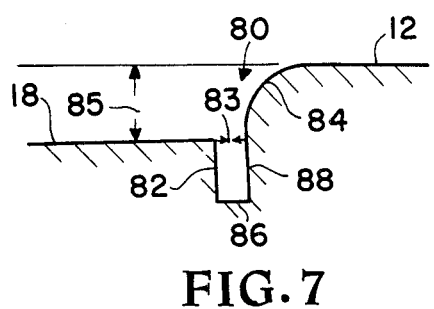
FIG. 7 is another alternate view of the interface mechanism.

FIG. 7 shows another embodiment of interface mechanism designated generally by the reference numeral 80. This structure has a first surface 82 which is normal to the leading edge structure 18 and directed inwardly toward the chordline 24. A fourth surface 88 is positioned generally parallel to the first surface 82 and is of a similar length. A third surface 86 connects the first surface 82 and fourth surface 88 to form the bottom of the gap 83. A curved surface 84 connects with the fourth surface 88 and the skin surface 12 to complete the interface mechanism. The radius of the curved surface 84 is equal to the perpendicular distance between the leading edge structure 18 and the skin 12. The step height 85 is also the perpendicular distance between the leading edge structure 18 and the skin 12.

Figure 8:
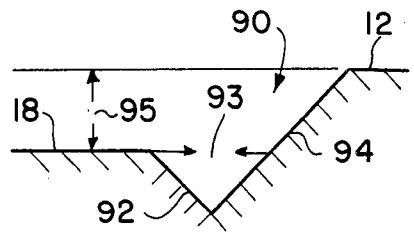
FIG. 8 is an alternate shape of the invention interface mechanism.

Another embodiment of the invention is shown in FIG. 8 and designated generally by the reference numeral 90. In this interface mechanism the first surface 92 is directed downwardly toward the chordline 24, and rearwardly toward the trailing edge of the airfoil at an obtuse angle of approximately 135°, relative to the leading edge surface 18. The second surface 94 is connected to the end of the first surface 92 and directed away from the chordline 24 and toward the trailing edge and connects with the surface 12 at an angle complementary to the angle of the first surface 92. A gap 93 is formed between the first and second surfaces 92 and 94. The height 95 is again the perpendicular distance between the leading edge structure 18 and the skin structure 12.

The depth and width of the gaps 43, 53, 63, 73, 83, and 93 are roughly equal to the heights of the steps 45, 55, 65, 75, 85, and 95. These gap widths and depths are those which typically occur in the manufacture of airfoils. These gap widths and depths have been shown experimentally to allow the invention to perform as discussed.

Figure 9:
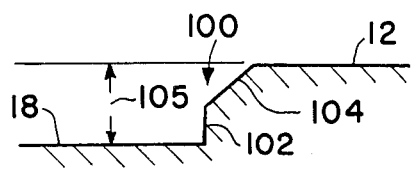
FIG. 9 is still another shape of an alternate interface mechanism.

FIG. 9 shows an alternate embodiment of the invention designated generally by the reference numeral 100. In this arrangement of the interface mechanism the shape is a variation of the step shown in the FIG. 3 embodiment, and does not include a gap. The first surface 102 is connected to the leading edge surface 18 and is directed at an angle normal thereto in a direction away from the chordline 24. The length of the first surface 102 is approximately one-third of the height 105 of the step. A second surface 104 is connected to the first surface 102 and directed at an obtuse angle relative to surface 18 of approximately 135° with respect thereto, and connects to the upper skin 12 to create the interface mechanism. The height 105 is the perpendicular distance between the leading edge structure 18 and the skin structure 12.

Figure 10:
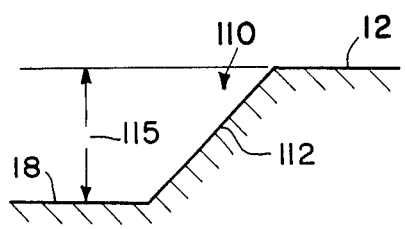
FIG. 10 is yet another shape of an alternate interface mechanism.

The embodiment shown in FIG. 10 is also an interface mechanism that does not utilize the gap principle and is designated generally by the reference numeral 110. In this embodiment, the first surface 112 is connected to the leading edge structure 18, and is directed away from the chordline 24 at an obtuse angle of approximately 135° toward the trailing edge of the airfoil and is connected directly to the skin structure 12. The height 115 is the perpendicular distance between the leading edge structure 18 and the skin structure 12.

Figure 11:
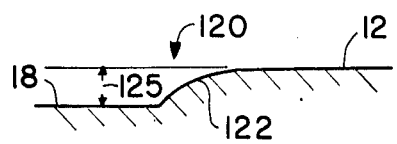
FIG. 11 is another shape of an alternate interface mechanism.

The FIG. 11 embodiment of the invention is also of the non-gap type and is designated generally by the reference numeral 120. In this arrangement, the interface mechanism 122 is of a polynomial shape for example, but not limited to, ellipses or ogives. One end thereof is connected to the leading edge structure 18 and the other end to the skin structure 12. The polynomial surface shape is directed away from the chordline 24 and toward the trailing edge of the airfoil. The height 125 of the interface mechanism is again the perpendicular distance between the leading edge structure 18 and the skin structure 12.

Figure 12:
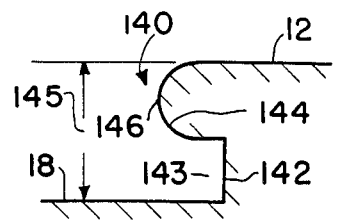
FIG. 12 is still another alternate shape of interface mechanism between the leading edge structure and the main skin panels of the airfoil.

FIG. 12 shows an embodiment of the invention which combines a shaped step with horizontal gap beneath the step, above the surface of the leading edge structure, and is generally designated by the reference numeral 140. In this embodiment, the leading edge structure 18 meets a normal surface 142 directed away from the chordline 24. The surface 142 joins to the wing skin 12 by a semicircular (or polynomial) shaped surface 144. The length of the surface 142 is roughly one-half of the total step height 145. The depth of the horizontal gap 143 is roughly equal to the length of surface 142. This embodiment of the invention may trap the laminar separation bubble in the gap 143, thus allowing a stagnation point to occur near the position 146 on surface 144. In this manner, the disturbances to the laminar free shear layer 128 may be reduced allowing increased step height 145.

OPERATION

From the above description, the operation of the invention is now believed to be apparent. It should be apparent that the interface mechanisms 30 and 35 may take on the shape of any of the embodiments shown in FIGS. 3-12. It should also be understood that the interface 30 might be of the design shown in FIG. 3, whereas the interface 35 might be of the design shown in FIG. 9, and obviously many other combinations are apparent within the scope of the invention as described above.

It should further be understood that the various passive interface mechanisms may be used with merely the leading edge structure 18 or in combination with the leading edge structure 18 and other types of leading edge structure such as the de-icing mechanism 20 or other leading edge structures such as flaps or slats, or for installation of inspection panels for interior access to airfoils. Potential applications for the invention also exist for joining skin panels on underwater vehicles or on automobile surfaces on which laminar flow is sought.

The interface mechanism design has application to a wide range of aircraft. It should be recognized that the height of the interface step is dependent on the performance characteristics of the aircraft with which it is being utilized, specifically the cruise Mach number and altitude at which the aircraft is flying. The height of the interface step can be determined by use of the formula $h<2700/R'$ which was utilized to construct the information in Table I in the following manner. The freestream unit Reynolds number, $R'$, is determined by dividing the freestream true airspeed of the airplane by the kinematic viscosity at the altitude of cruise. Then the allowable step height is determined by dividing 2700 by $R'$, yielding a conservative value for allowable step height. That is, the step height should be less than the value thus determined to assure no loss of laminar flow. For example, the first step height calculation in Table I (Boeing 767) was performed in the following manner: At an altitude of 41,000 feet, a Mach number of 0.80 is equal to a true airspeed, V, of 775 ft/sec; at this altitude kinematic viscosity, $\nu$ is equal to $5.3084 \times 10^{-4}$ ft²/sec. Therefore, freestream unit Reynolds number, $R'=V/\nu$, is $1.46 \times 10^6$ ft$^{-1}$, and the critical step height is:

$$h < 2700/1.46 \times 10^6 \text{ ft}^{-1}$$

or $$h < 0.00185 \text{ ft}$$

or $$h < 0.022 \text{ inches.}$$

Although the invention has been described relative to specific embodiments thereof, it is not so limited and numerous variations thereof will be readily apparent to those skilled in the art. For example, the gap widths and depths may vary depending on conditions such as flow, skin surfaces, and leading edge mechanisms joined to the airfoil skins. The shapes, angles, and heights of the interface mechanisms may vary, depending on the vehicles or devices into which the invention is incorporated.

What is claimed as new and desired to be secured by Letter Patent of the United States is:

1. A passive laminar flow control device comprising:
   airfoil means;
   said airfoil means having upper surface skin structure and lower surface skin structure joining at a trailing edge;
   separate smooth leading edge structure capable of sustaining laminar flow joined to said upper and lower skin structure at a location between a midchord and a nose station of said airfoil means;
   a forward facing interface mechanism means rising above the leading edge structure at the juncture of said upper and lower skin structure and the leading edge structure forming a laminar separation bubble;
   said interface mechanism means being shaped to cause laminar flow separation before and laminar reattachment after the laminar separation bubble for accomplishing laminar boundary layer flow over said airfoil means; and
   said upper skin structure, lower skin structure, and interface mechanism means having spanwise dimensions to form an operative airfoil means.

2. A passive laminar flow control device as in claim 1 wherein said interface mechanism means is shaped such that it steps into the upper skin structure and lower skin structure along a radius of curvature.

3. A passive laminar flow control device as in claim 1 wherein said interface mechanism means is shaped such that it turns toward a chordline of the airfoil means just prior to the juncture of the leading edge structure and the skin structure and reverses direction into the skin structure forming a gap therebetween.

4. A passive laminar flow control device as in claim 2 wherein the radius of curvature is approximately equal to the distance between a line tangent to the leading edge structure at the point of juncture and a line tangent to the skin structure at a point where the radius of curvature fairs into the skin structure.

5. A passive laminar flow control device as in claim 3 wherein the radius of curvature is approximately equal to the distance between a line drawn tangent to the gap bottom and a line tangent to the skin structure at a point where the radius of curvature fairs into the skin structure.

6. A passive laminar flow control device as in claim 3 wherein the interface mechanism means is of a shape where a first surface thereof is directed generally normal to the leading edge structure at the area of juncture; and a second surface connected thereto which is directed at an acute angle to the first surface and connects with said skin structure.

7. A passive laminar flow control device as in claim 3 wherein the interface mechanism means is of a shape where a first surface thereof is directed generally normal to the leading edge structure at the area of juncture;
a second surface generally parallel to said first surface that connects with said skin structure; and
a third surface that is generally normal to and interconnects said first and second surfaces.

8. A passive laminar flow control device as in claim 3 wherein the interface mechanism means is of a shape where a first surface thereof is directed generally normal to the leading edge structure at the area of juncture;
a fourth surface is parallel to and the length of said first surface, a third surface is normal to and connected with said first and fourth surfaces; and
a second surface is connected with said fourth surface and directed at an acute angle thereto is tied in with said skin structure.

9. A passive laminar flow control device as in claim 3 wherein the interface mechanism means is of a shape where a first surface thereof is directed generally normal to the leading edge structure at the area of juncture;
a second surface is connected with said first surface and has a radius of curvature that fairs into said skin structure.

10. A passive laminar flow control device as in claim 3 wherein the interface mechanism means is of a shape where a first surface thereof is directed generally normal to the leading edge structure at the area of juncture;
a fourth surface is parallel to and the length of said first surface, a third surface is normal to and connected with said first and fourth surfaces; and
a second surface is connected with said fourth surface and having a radius of curvature that fairs into said skin structure.

11. A passive laminar flow control device as in claim 3 wherein the interface mechanism means is of a shape where a first surface thereof is connected to said leading edge structure and directed toward the chordline of said airfoil means at an angle greater than 90° to the leading edge structure at the area of juncture, and a second surface connected thereto and directed at an angle greater than 90° to said first surface and tied to said skin structure.

12. A passive laminar flow control device as in claim 1 wherein said interface mechanism means has a first surface connected to said leading edge structure and directed generally normal to and in a direction away from a chordline of said airfoil means; and
a second surface connected to said first surface is directed at an acute angle thereto and tied to said skin structure.

13. A passive laminar flow control device as in claim 1 wherein said interface mechanism means has a first surface connected to said leading edge structure and directed away from a chordline of said airfoil means at an acute angle to said leading edge structure in the junction area, and being connected to said skin structure.

14. A passive laminar flow control device as in claim 2 wherein said interface mechanism means has a first surface connected to said leading edge structure and directed away from a chordline of said airfoil means at a polynomial direction thereto and being connected to said skin structure.

15. A passive laminar flow control device as in claim 1 wherein said interface mechanism means has a first surface connected to said leading edge structure and directed generally normal thereto and away from a chordline of the airfoil means; and
a second arcuate surface connected to said first surface and directed back toward said leading edge and reversing direction and is connected to said skin structure.

16. A passive laminar flow control device as in claim 1 wherein said interface mechanism is a forward facing step shaped in a direction away from a chordline of said airfoil means.

17. A passive laminar flow control device as in claim 16 wherein the dimensions of the interface mechanism means forward facing, shaped step are determined by the formula $h < 2700/R'$.

18. A passive laminar flow control device as in claim 1 wherein said leading edge structure is a flap means of an airfoil.

19. A passive laminar flow control device as in claim 1 wherein said leading edge structure is a de-icing means.

20. A passive laminar flow control device as in claim 1 wherein said leading edge structure is a slat means.

21. A passive laminar flow control device as in claim 1 wherein said leading edge structure is an inspection panel means.

22. The method of obtaining natural laminar flow over an airfoil comprising the steps of:
smoothing the upper and lower skin structure of an airfoil sufficient to allow laminar flow;
placing a smooth leading edge structure adjacent said skin structures;
joining said leading edge structure to said skin structure;
providing a forward facing step joint rising above the leading edge structure and located before the skin structure; and
shaping the step joint between the leading edge structure and skin structure to cause laminar separation before and reattachment after a laminar separation bubble formed thereat which allows extended natural laminar flow after the step joint location.

* * * * *